(12) United States Patent
Wolf

(10) Patent No.: US 7,047,214 B2
(45) Date of Patent: *May 16, 2006

(54) PROCESS FOR PROVIDING EVENT PHOTOGRAPHS FOR INSPECTION, SELECTION AND DISTRIBUTION VIA A COMPUTER NETWORK

(76) Inventor: Peter H. Wolf, 509 Raindance St., Thousand Oaks, CA (US) 91360-1219

( * ) Notice: Subject to any disclaimer, the term of this patent is extended or adjusted under 35 U.S.C. 154(b) by 0 days.

This patent is subject to a terminal disclaimer.

(21) Appl. No.: 11/261,747

(22) Filed: Oct. 27, 2005

(65) Prior Publication Data

US 2006/0047586 A1    Mar. 2, 2006

Related U.S. Application Data

(63) Continuation of application No. 09/641,248, filed on Aug. 17, 2000, now Pat. No. 6,985,875.

(60) Provisional application No. 60/163,879, filed on Nov. 5, 1999.

(51) Int. Cl.
    *G06F 17/60*    (2006.01)
(52) U.S. Cl. .................... 705/26; 348/157; 348/207.1; 396/153
(58) Field of Classification Search ................ 705/26, 705/27; 348/157, 207.1; 396/153
    See application file for complete search history.

(56) References Cited

U.S. PATENT DOCUMENTS

| | | | |
|---|---|---|---|
| 3,829,869 A * | 8/1974 | Balko et al. ............... 396/315 |
| 3,890,463 A * | 6/1975 | Ikegami et al. ............ 348/157 |
| 3,946,312 A | 3/1976 | Oswald et al. |
| 4,074,117 A * | 2/1978 | DeLorean et al. ........... 377/20 |
| 4,571,698 A | 2/1986 | Armstrong |
| 4,643,585 A * | 2/1987 | Hillesland ..................... 368/9 |
| 4,743,971 A * | 5/1988 | Hugli ......................... 348/157 |

(Continued)

FOREIGN PATENT DOCUMENTS

JP    2003348424    * 12/2003

OTHER PUBLICATIONS

No Author, "The LaSalle Bank Chicago Marathon", MarathonFoto, http://www.chicagomarathon.com/2002/tier2/merchandise/marathonfoto.html.*

*Primary Examiner*—Wynn Coggins
*Assistant Examiner*—Naeem Haq
(74) *Attorney, Agent, or Firm*—Kelly Lowry & Kelley, LLP

(57) ABSTRACT

A process for providing event photographs for inspection, selection and distribution via a computer network generally includes the steps of taking event photographs, associating identifying data with each photograph taken, transferring the photographs to a computer network server, and permitting access to the server for searching of a particular photograph utilizing the identifying data. The identifying data can include a name of an event participant, a number corresponding to a number worn by the event participant, the date and time the photograph was taken, or a code captured from a component as it passes a sensor. Such a component can be passive or active and can include a bar code, inductive device or an electronic transmitting device which is worn by the event participant. The event participants are informed of the identifying data by posting the identifying data associated with each photograph so that it is made available to the participants of the event for later use in searching the server. The photographs are cataloged in the server according to the identifying data and can be subsequently ordered using the server which is typically an Internet web-site.

20 Claims, 2 Drawing Sheets

U.S. PATENT DOCUMENTS

| | | | |
|---|---|---|---|
| 4,752,764 A | 6/1988 | Peterson et al. | |
| 4,763,284 A * | 8/1988 | Carlin | 702/41 |
| 4,774,679 A * | 9/1988 | Carlin | 702/41 |
| 5,103,433 A * | 4/1992 | Imhof | 368/9 |
| 5,245,162 A | 9/1993 | Takahashi | |
| 5,381,155 A * | 1/1995 | Gerber | 342/104 |
| 5,511,045 A * | 4/1996 | Sasaki et al. | 368/2 |
| 5,552,824 A * | 9/1996 | DeAngelis et al. | 348/157 |
| 5,576,838 A * | 11/1996 | Renie | 386/117 |
| 5,655,053 A * | 8/1997 | Renie | 386/117 |
| 5,657,077 A * | 8/1997 | DeAngelis et al. | 348/157 |
| 5,671,010 A * | 9/1997 | Shimbo et al. | 348/157 |
| 5,696,481 A | 12/1997 | Pejas et al. | |
| 6,064,308 A | 5/2000 | Janning et al. | |
| 6,072,751 A | 6/2000 | Kirson et al. | |
| 6,104,864 A * | 8/2000 | Kondo et al. | 386/117 |
| 6,411,329 B1 * | 6/2002 | Richard et al. | 348/157 |
| 6,433,817 B1 * | 8/2002 | Guerra | 348/157 |
| 6,504,571 B1 * | 1/2003 | Narayanaswami et al. | 348/231.99 |
| 6,532,345 B1 * | 3/2003 | Gluck | 396/427 |
| 6,545,705 B1 * | 4/2003 | Sigel et al. | 348/157 |
| 6,600,407 B1 | 7/2003 | Paek | |
| 6,608,563 B1 * | 8/2003 | Weston et al. | 340/573.1 |
| 6,917,565 B1 | 7/2005 | Kishida | |
| 2003/0235116 A1 | 12/2003 | Stobbe | |
| 2004/0100566 A1 | 5/2004 | Valleriano et al. | |
| 2004/0135902 A1 * | 7/2004 | Steensma | 348/231.99 |
| 2004/0213087 A1 | 10/2004 | Gillette et al. | |

\* cited by examiner

PROCESS FOR PROVIDING EVENT PHOTOGRAPHS FOR INSPECTION, SELECTION AND DISTRIBUTION VIA A COMPUTER NETWORK

RELATED APPLICATION

This application is a continuation of application Ser. No. 09/641,248, filed Aug. 17, 2000 now U.S. Pat. No. 6,985,875 which claims the benefit of Provisional application Ser. No. 60/163,879, filed Nov. 5, 1999.

BACKGROUND OF THE INVENTION

The present invention relates to event photography. More particularly, the present invention relates to a process for providing event photographs for inspection, selection and distribution via a computer network, such as a web-site on the Internet.

Event photography has traditionally relied on identifying markings commonly known as "bib numbers" that are attached on event participants, such as runners or bicycle riders, so as to be easily visible. Event photographs are taken along the event route or finish line and then developed and scrutinized for the identifying markings of event participants. The name and mailing address of event participants who are identifiable by their bib number markings are then cross checked to an address roster of the event participants that list all event participants, their bib or identification numbers and their addresses.

A thumbnail photographic image of the identified event participant is then printed and mailed to the event participant along with an order form that needs to be filled out by the event participant and transmitted back to the photographers by mail, fax or e-mail, and accompanied by a check, money order or credit card authorization. Upon receipt of the order form, the photographer then develops or produces the requested photograph, such as a 3"×5" or 8"×10" picture, and mails it back to the event participant to complete the transaction.

This method usually requires several weeks or even months of time and is costly due to the multiple mailings between the photographer and the event participants. Furthermore, event participants are typically given only a limited time to order their photograph. Additional costs are typically charged for archival retrievals, if they are even available.

Some of the event participants are not offered the option of purchasing photographs because the identifying bib number markings are often not visible in the photographs. This could be due to one event participant obscuring the markings of another, the photograph being taken at an angle which did not reveal the bib number markings, or the bib numbers being improperly attached to the event participant or lost along the event route. The pictures of these non-identifiable event participants have no value since they cannot be traced to the participant. Means are not typically provided for the participant to search for their photographs.

Accordingly, there is a need for a process which allows a photographer to capture event photographs without relying solely on the need to identify markings, such as bib numbers, on the event participants. What is also needed is a process which allows the event participant to search for photographs taken at the event. What is further needed is a process which eliminates the time and cost of multiple mailings between the photographer and the event participants seeking photographs. The present invention fulfills these needs and provides other related advantages.

SUMMARY OF THE INVENTION

The present invention resides in a process for providing event photographs for inspection, selection and distribution via a computer network, such as a web-site server of the world wide web. Event photographs are first taken and identifying data is associated with each photograph. The identifying data can take one of several forms, including a number corresponding to a number worn by an event participant, the date and time the photograph was taken, and/or a name of an event participant. In a particularly preferred form of the invention, an active or passive component is worn by the event participant which includes a code used as the identifying data for the photograph taken. The camera can be triggered automatically when the component passes a sensor placed at a predetermined location, such as the finish line. Such components can include a bar code, inductive circuit, or an electronic device having a transmitter.

The identifying data assigned to each photograph is posted so as to be readily available to the participants of the event. The photographs are then transferred to the computer network server where they are cataloged according to the identifying data.

One interested in viewing photographs of the event can access the computer network server and search for a particular photograph utilizing the identifying data. In the event the participant is using time as the identifying data and this time is not known, a particular photograph can be searched using the approximate time it was taken. The approximate time can be calculated according to various estimating algorithms. One such preferred algorithm has the following formula: $T_p=(L_p/L_c)(Tf)$, wherein $L_p$ equals the distance from a starting point of the event to the photographer, $T_p$ equals the minutes from the starting point to a photographer at location $L_p$, $L_c$ equals the total distance of the event, and Tf equals the total minutes to finish the event by the participant.

After searching, the particular photograph is displayed for inspection. The photograph may be ordered on-line. The order is fulfilled by sending the photograph to the person ordering. This is done by electronically transmitting the photograph, preferably via e-mail, allowing the person who has logged onto the computer network to print the photograph onto his or her printer, or the photograph is printed and subsequently mailed by the computer network server host utilizing information provided by the person ordering the photograph.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
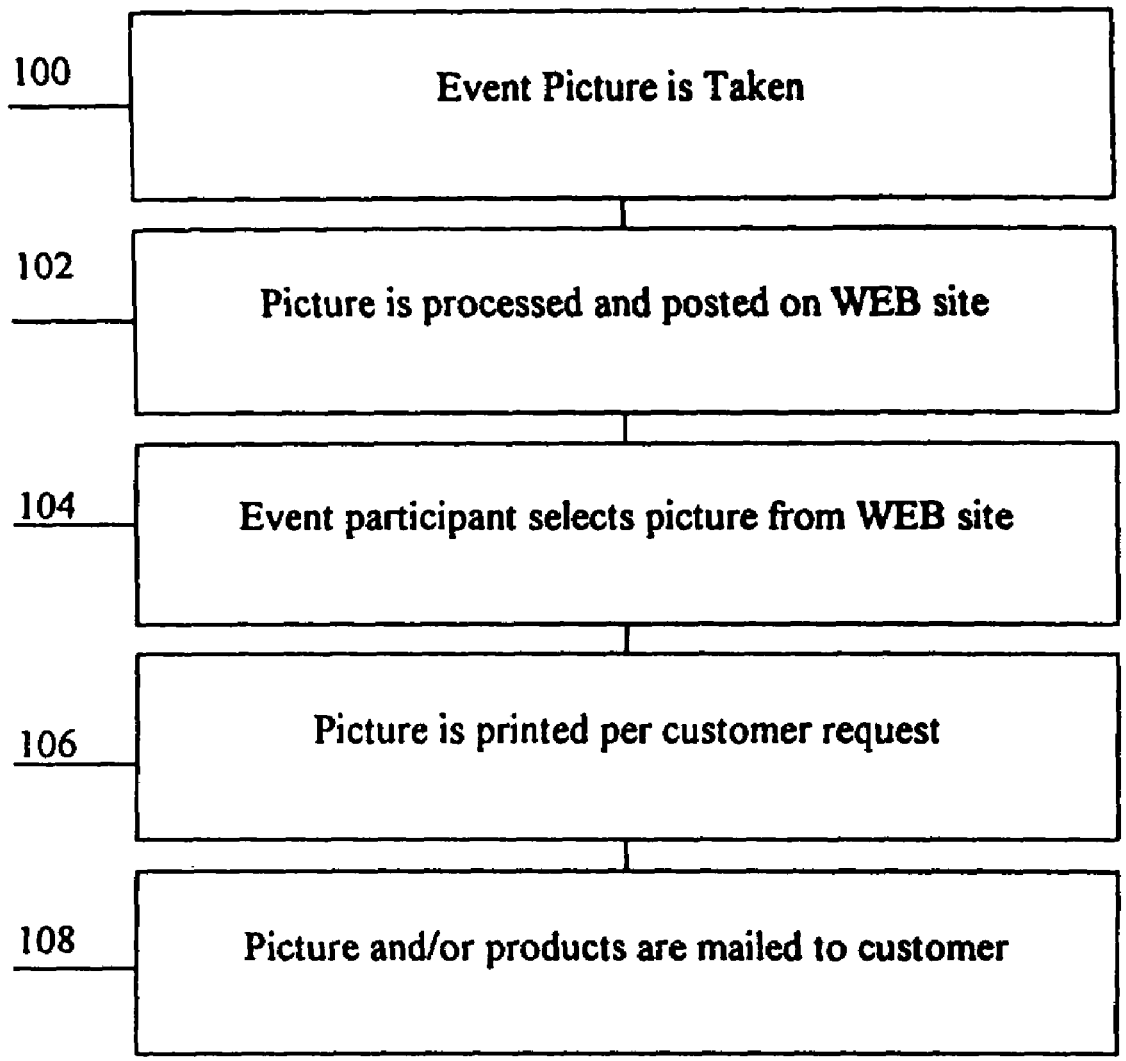
FIG. 1 is a flow chart illustrating the general steps taken in accordance with the present invention.

As shown in the drawings for purposes of illustration, the present invention is concerned with a process for providing event photographs for inspection, selection and distribution via a computer network, such as the world wide web. The process of the invention is generally shown in FIG. 1. Pictures (photographs) at an event are first taken (100). The event can comprise any organized event, such as a dance or graduation ceremony, but is particularly suited for athletic events such as bicycling, marathon, triathlon, hockey and other organized sporting events. Pictures of participants of these events, such as the bicyclists, runners, etc., are taken during the event. For example, a picture of each participant of a race, such as a marathon, may be taken at the finish line. Pictures may also be taken during the course of the event or during celebrations after the event.

Several methods can be employed to synchronize and record the moment of taking an event photograph. A large and visible number, letter, symbol or combination thereof can be displayed to the event participant as he or she passes the photographer. The assigned number, letter, symbol or combination thereof correspond to the photograph that was taken. The event participant is informed that he or she should remember the number, letter, or symbol displayed for later access to the photograph.

For example, a large clock with bearing a sign informing participants to remember their time can be placed next to the photographer or remotely controlled camera which electronically records the date, hour, minute and second when the picture was taken as the participant passes by the camera. If this is not practical, the event participants can be given a card bearing the date and time stamped thereon for later use. Digital photographs may be taken during the event wherein each photograph has embedded within it data of the local time the picture was taken, including the year, month, day, hour, minute and seconds.

Another method of synchronizing the moment of the taking of the event photograph is by capturing a code from either an active or passive component worn by an event participant which identifies that participant. Sensors can be placed near the photographer or camera for interfacing with the component as the event participant passes the camera. Such passive components can include a bar code with the sensor comprising a bar code reader. This would be used similar to a toll road wherein bar codes are placed on a car in order to allow that car to pass through the toll booth area which scans the bar code and allows the car to proceed without the need to stop. Another such passive component can include a system similar to that used in department stores wherein an inductive circuit embedded in a housing activates an alarm as it passes through sensors. Alternatively, the component can comprise an active component including an electronic device having a transmitter which transmits a signal that triggers the sensor as it passes thereby.

Major events, such as the Los Angeles Marathon, Iron Man Competition, etc., currently employ such passive or active components, referred to as "racing chips", which are typically strapped to a participant's ankle. As the participant passes a mat on the ground his or her unique chip is identified and transmitted via computer and telephone wires to a central web-site so that anyone in the world can monitor a participant's progress along the race in real time.

The code can be captured by the sensor from the device or embedded within or otherwise transferred to the device for later reading. The code derived from the component can be decoded after the event and then assigned a time stamp or unique number, or the code itself may directly input information about the identity of the participant. This identifying information can be utilized in identifying the photograph taken, as well as acting to trigger the remote camera to take a shot as the participant passes over the mat.

The pictures are then processed and posted on a computer network, preferably a web-site of the Internet (102). Event participants are informed of the web-site and after the event access the web-site to inspect and select pictures of themselves from the event. Other pictures of the event day are also offered for sale in the form of photographs and other novelty items. Participants of a sporting event or other special occasion can find their pictures online by selecting the event and searching for their picture utilizing their assigned identifying data. As described above, this data may comprise numbers or symbols, or the time when the photograph was taken. If the event participant cannot remember the identifying data, i.e. when his or her picture was taken, various estimating algorithms are made available to assist the event participant to locate his or her picture.

A particularly preferred algorithm has the following formula: $T_p=(L_p/L_c)$ $(Tf)$, wherein $L_p$ equals the distance from a starting point of the event to the photographer, $T_p$ equals the minutes from the starting point to a photographer at location $L_p$, $L_c$ equals the total distance of the event, and Tf equals the total minutes to finish the event by the participant. This algorithm could utilize the participant's starting and finish time as these times are commonly remembered or easily estimated by the event participant. The participant simply selects his or her starting and finish time on the computer screen in addition to selecting where along the event route the desired picture is to be located. Although the calculation assumes that the participant traveled at a relatively constant speed, such an assumption has proven to be reasonable from actual observations. The host computer will automatically display the photograph found based upon the calculation of the formula and allow the participant to conveniently search other photograph near the estimated ones in order to find the particular photograph in question.

After an event participant selects the picture from the web-site to be ordered (104), a picture can be electronically transferred, such as by e-mail, or printed per the customer request (106). Special photographic paper and state of the art printers are preferably used by the host to produce high resolution, printed photographs in a variety of sizes. The photographs and/or products can be produced and mailed to the customer (108).

Preferably, the event photographs are posted on the web-site either in real time or within twenty-four hours of the event for offer of sale and the ordered photograph mailed to the customer in as little as one day after their request.

Figure 2:
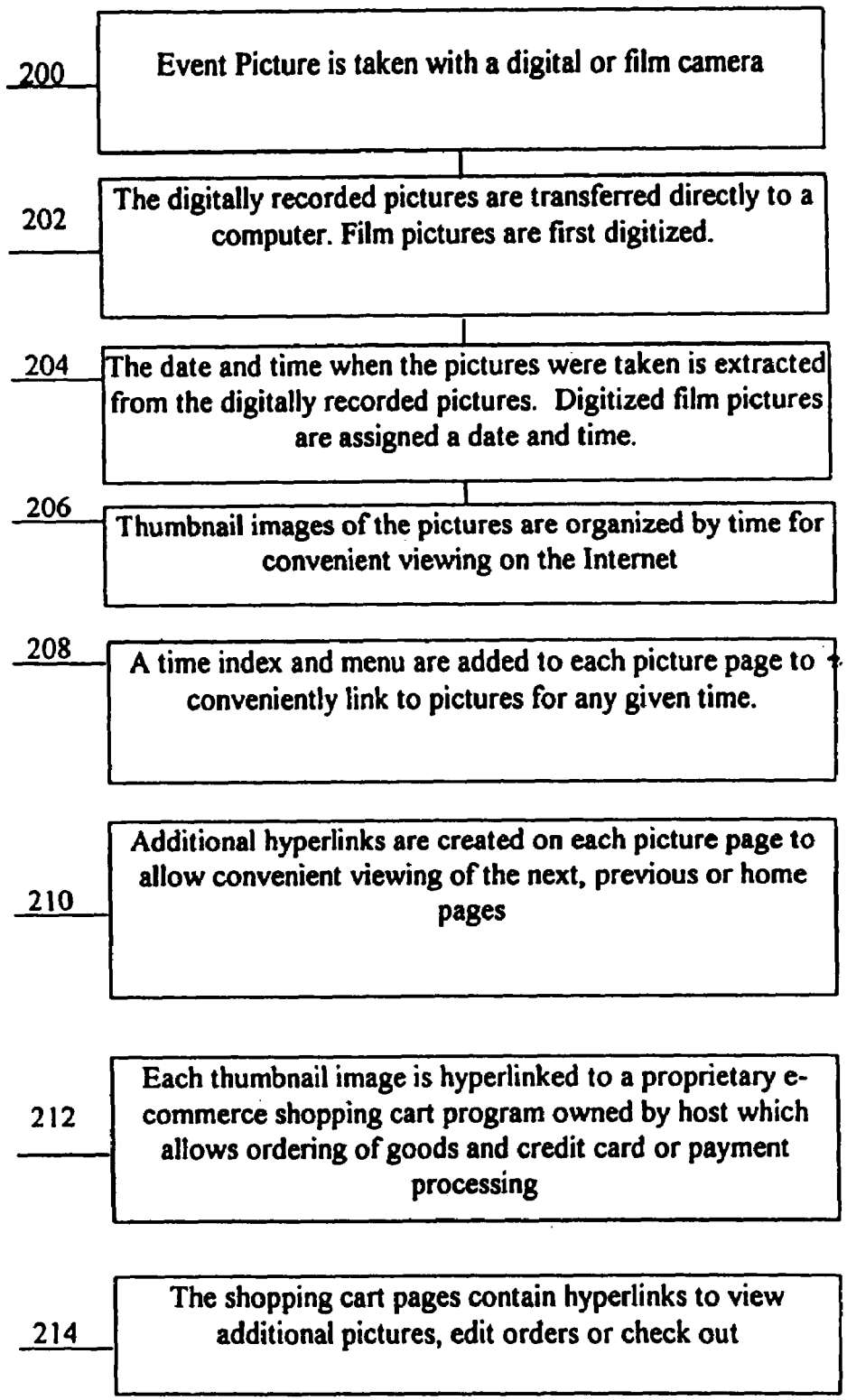
FIG. 2 is a flow chart illustrating the steps taken in a preferred embodiment of the present invention.

FIG. 2 illustrates a preferred method of the invention which provides the services and end product in this short time window. An event picture is taken with a film, or preferably digital, camera (200). If the pictures are taken with a film camera, they must first be digitally recorded. Then, the digitally recorded pictures are transferred directly to a computer (202). This can occur remotely by downloading the pictures through a communications network, such as telephone lines. Typically, the date and time when the pictures were taken is extracted from the digitally recorded pictures. The pictures are assigned that date and time (204). Thumbnail images of the pictures are organized by the assigned date and time for convenient viewing by the participants on the Internet (206). A time index and menu are added to each picture page in order to allow the participant searcher to conveniently link to pictures for any given time (208), as in the case when the time is not known exactly and instead estimated by the participant searcher. Additional hyperlinks are created on each page to allow convenient viewing of the next, previous or home pages (210). Each thumbnail image is hyperlinked to an electronic commerce shopping cart program of the host which allows ordering of pictures and other goods through a credit card or payment processing system (212). The shopping cart pages contain hyperlinks to view additional pictures, edit orders or check out of the system (214).

It is to be understood that the use of a digital camera can allow the photographs to be downloaded and displayed on the web-site in as little as real time or within one or two days after the event. Purchases are not restricted to pictures alone, but can included related products with the pictures such as coffee mugs, t-shirts, key chains, mouse pads etc. Upon checkout, an e-mail message is sent to the customer in order to confirm his or her purchases. If necessary, an electronic message containing the order information is also transmitted to the event photography business.

All processing and ordering of pictures is conducted electronically, alleviating the material and shipping costs typically associated with such transactions as well as significantly reducing the time in which an event participant can receive photographs of the event. In addition to the obvious advantages to the photography business and event participants, the event itself is ☐enefited due to the added exposure of those viewing photographs of the event as well as information about the event which can be provided on the web-site.

Although several embodiments have been described in detail for purposes of illustration, various modifications may be made without departing from the scope and spirit of the invention. Accordingly, the invention is not to be limited, except as by the appended claims.

What is claimed is:

1. A process providing event photographs of a sporting event for inspection, selection and distribution via a computer network, comprising the steps of:
    taking photographs of at least one participant of a sporting event along at least one point of a course or field thereof;
    associating identifying data with each photograph taken, wherein the identifying data is selected from at least one of: a number corresponding to a number worn by a participant, a participant's name, a code acquired from a component worn by a participant, and a date and time, including hour and minute the photograph was taken;
    informing the sporting participants of the identifying data;
    transferring the photographs to a computer network server;
    cataloging each of the photographs in a web-site server according to the identifying data so that the server can be accessed and a photograph of a particular sporting event participant can be searched for utilizing the identifying data; and
    displaying the photograph of the sporting event participant for inspection and ordering.

2. The process of claim 1, including the step of posting data associated with the web-site server and each photograph so that it is made available to the participants of the event for later use in searching the server at a location other than the sporting event.

3. The process of claim 1, wherein when the identifying data comprises a code acquired from a component worn by the sporting event participant, including the step of triggering a camera to take a photograph when the component passes a predetermined point.

4. The process of claim 1, wherein the component comprises a passive component, a bar code, an inductive circuit, or an active component.

5. The process of claim 1, wherein when the date and time is selected as the identifying data, an approximate time is used to search for a particular photograph.

6. The process of claim 5, wherein the approximate time is calculated using the following formula:

$$T_p=(L_p/L_c)(Tf);$$

wherein $L_p$ equals the distance from a starting point of the event to the photographer;
   wherein $T_p$ equals the minutes from the starting point to a photographer at location $L_p$;
   wherein $L_c$ equals the total distance of the event; and
   wherein Tf equals the total minutes to finish the event by the participant.

7. The process of claim 1, including the step of providing a digital camera electronically connected to the server for immediate download of photographs from the event to the server.

8. The process of claim 1, including the steps of ordering a photograph of the event using the server and fulfilling the order by sending the photograph.

9. The process of claim 8, including the step of mailing the photograph utilizing information provided by the person ordering the photograph.

10. The process of claim 8, including the step of electronically transferring the photograph to the person ordering the photograph.

11. A process providing sporting event photographs of sporting event competitors for inspection, selection and distribution via a computer network, comprising the steps of:
    taking photographs of one or more competitors of a sporting event along at least one point of a course or field thereof;
    associating identifying data with each photograph taken, wherein the identifying data comprises the date and time when the photograph was taken during the sporting event;
    informing the sporting event competitors of the identifying data;
    transferring the photographs to a computer network server;
    cataloging each of the photographs in a web-site server according to the identifying data so that the server can be accessed and a photograph of a particular sporting event participant can be searched for utilizing the date and time the photograph was taken; and
    displaying the photograph of the particular competitor for inspection and ordering.

12. The process of claim 11, including the step of posting data associated with the web-site server and each photograph so that it is made available to the sporting event competitors of the event for later use in searching the server at a location other than the sporting event.

13. The process of claim 11, wherein an approximate time is used to search for a particular photograph.

14. The process of claim 13, wherein the approximate time is calculated using the following formula:

$$T_p=(L_p/L_c)(Tf);$$

wherein $L_p$ equals the distance from a starting point of the event to the photographer;

wherein $T_p$ equals the minutes from the starting point to a photographer at location $L_p$;

wherein $L_c$ equals the total distance of the event; and wherein Tf equals the total minutes to finish the event by the participant.

15. The process of claim 11, including the step of providing a digital camera electronically connected to the server for immediate download of photographs from the event to the server.

16. The process of claim 11, including the steps of ordering a photograph of the event using the server and fulfilling the order by sending the photograph.

17. A process for providing sporting event photographs of sporting event competitors for inspection, selection and distribution via a computer network, comprising the steps of:

taking photographs of one or more competitors of a sporting event along at least one point of a course or field thereof;

associating identifying data with each photograph taken, wherein the identifying data comprises a number worn by the sporting event competitor;

informing the event competitors of the identifying data;

transferring the photographs to a computer network server;

cataloging each of the photographs in a web-site server according to the identifying data so that the server can be accessed and a photograph of a particular sporting event participant can be searched for utilizing the number worn by the sporting event competitor; and displaying the photograph of the competitor for inspection and ordering.

18. The process of claim 17, including the step of posting data associated with the web-site server and each photograph so that it is made available to the sporting event competitors of the event for later use in searching the server at a location other than the sporting event.

19. The process of claim 17, including the step of providing a digital camera electronically connected to the server for immediate download of photographs from the event to the server.

20. The process of claim 17, including the steps of ordering a photograph of the event using the server and fulfilling the order by sending the photograph.

* * * * *